A. RUETSCHI.
TRANSMISSION MECHANISM.
APPLICATION FILED OCT. 16, 1913.
1,200,876.
Patented Oct. 10, 1916.
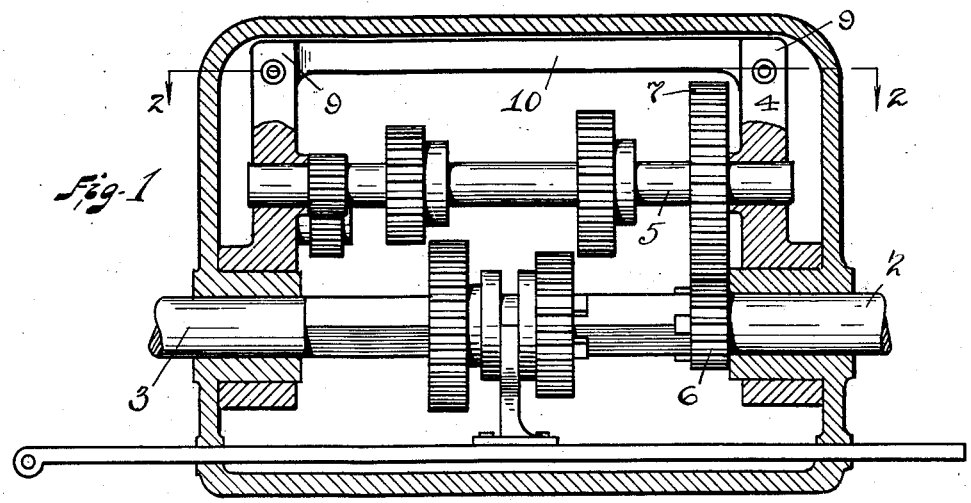
Fig-1
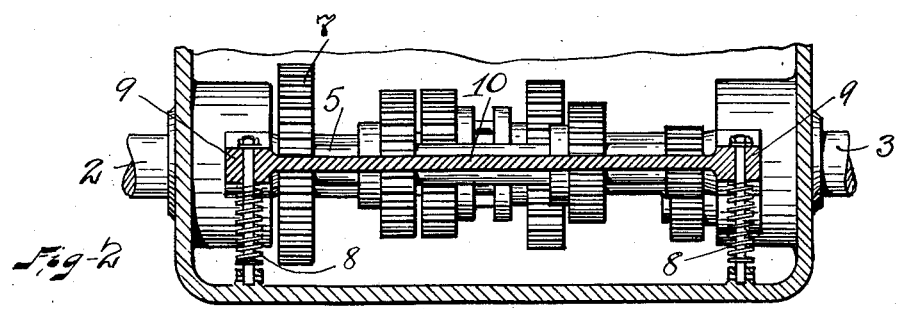
Fig-2
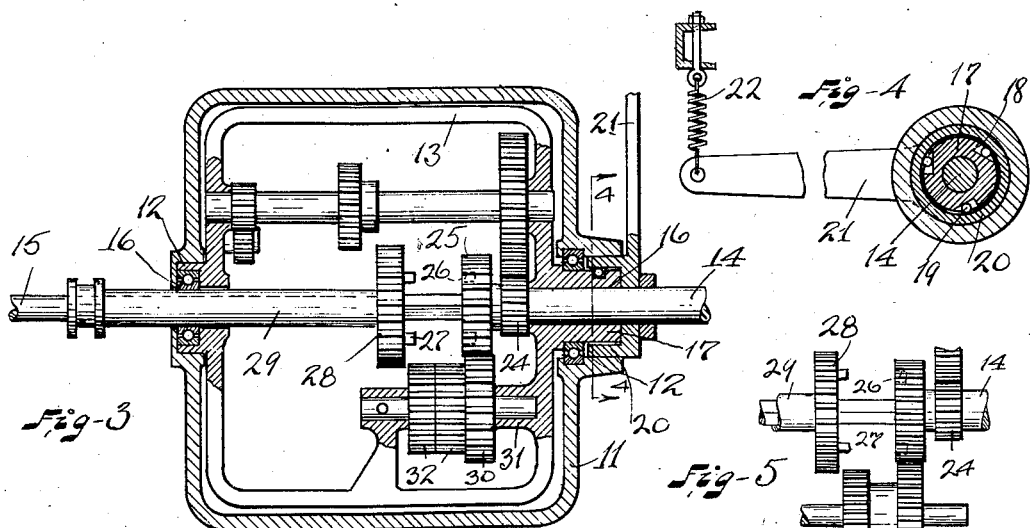
Fig-3
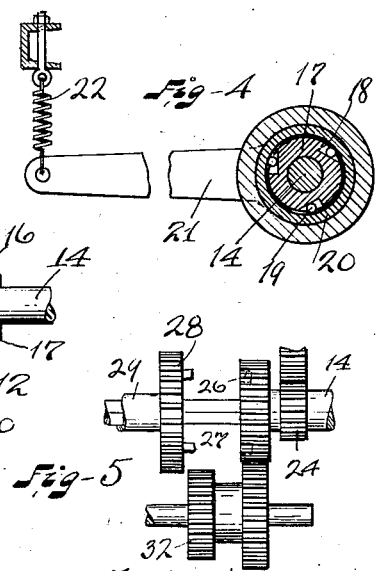
Fig-4
Fig-5
Witnesses
Oliver M. Kappler
H. B. Fay
Inventor
Arnold Ruetschi
By Fay r Oberlin
Attorneys

UNITED STATES PATENT OFFICE.

ARNOLD RUETSCHI, OF LAKEWOOD, OHIO.

TRANSMISSION MECHANISM.

1,200,876.  Specification of Letters Patent.  Patented Oct. 10, 1916.

Application filed October 16, 1913. Serial No. 795,450.

*To all whom it may concern:*

Be it known that I, ARNOLD RUETSCHI, a citizen of the United States, and a resident of Lakewood, county of Cuyahoga, and State of Ohio, have invented a new and useful Improvement in Transmission Mechanism, of which the following is a specification, the principle of the invention being herein explained and the best mode in which I have contemplated applying that principle, so as to distinguish it from other inventions.

The subject of the present invention is a resilient supporting means adapted to be connected in that type of transmission, which is commonly known as a sliding transmission, and which is so generally used in automobiles at present. While this transmission is in general efficient, it is faulty in one particular, which is that inexpert users are liable to cause very severe shocks to the counter-shaft which is placed parallel to the main driving shaft upon letting in the clutch. The result of these shocks is of course a considerable loosening and undue wear between the counter-shaft and its bearings as well as occasional injury to the gears themselves and to the entire train of mechanism driven thereby. It is to prevent this extra wear and to absorb the shocks which cannot be prevented that the present invention has been designed. In addition to these features it is intended to provide means which permit the most used shift (or speed change), that from "high" to "intermediate" to be made without disengagement of the clutch. My invention is not, of course, limited in its uses to this particular field, as it may be used in other transmission mechanism for other purposes wherever any severe strain is thrown upon a counter-shaft. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1 is a horizontal section through a transmission case of the sliding type illustrating the application of my invention thereto; Fig. 2 is a vertical section on the line 2—2 in Fig. 1; Fig. 3 is a section similar to that shown in Fig. 1, but showing a different form of the invention; Fig. 4 is a section on the line 4—4, Fig. 3; and Fig. 5 shows a modified construction.

The type of transmission which is shown in Fig. 1 is the well known progressive type, and as the precise details of construction and operation will have no effect upon the present invention, it will be unnecessary to describe the transmission further than to say that there is a fixed casing 1 in which are journaled a driving shaft 2, and a driven shaft 3 alined therewith. In the fixed casing is an oscillatory casing 4 in which is rotatably mounted the usual counter-shaft 5 driven from the shaft 2 by gears 6 and 7. Upon rotation of the driving shaft the counter-shaft (in all speeds but "high") will be met by a strong resistance to turning by reason of the load on the driven shaft, the result being a tendency on the part of the casing 4, or carrier, to turn about the driving shaft as an axis. If this casing is allowed to turn slightly and is then gradually and resiliently retarded until brought to a stop, the initial shock resulting from the engagement of the clutch is absorbed instead of being transmitted directly through the entire train of driving mechanism, as it is in the present types. Any suitable shock absorbing mechanism may be used for this purpose, an extremely simple and highly effective one being here shown. It consists of resilient springs 8 interposed between laterally extending arms or lugs 9 attached to the casing 4, and rigidly connected by a bar 10, and the bottom of the outer or fixed casing 1. The precise type of resilient means used is obviously unimportant, the present specific springs being merely illustrative.

Another type of rotation absorbing means may be used, which is shown in Figs. 3 and 4. A fixed casing 11 is there supplied at either end with bearings 12 in which the second casing or carrier 13 is rotatably mounted, the driving and driven shafts 14 and 15, respectively, being journaled in suitable bearings 16 in the carrier. The carrier is provided at its forward end with an extending sleeve 17 which is provided with a plurality of spaced notches or slots 18 in which are disposed hardened steel balls or rollers 19 which are adapted, upon oscillation of the carrier in one direction, to engage and pick up a drum 20 rotatably mounted upon the driving shaft and attached to a radially extending lever 21. The oscillation of the carrier will be caused upon the application of power as explained in the foregoing description, and the carrier will then tend to rotate in one direction, such rotation causing the one-way ball clutch to act upon the drum and to rotate the same in unison with the carrier. This rotation of the drum swings the lever 21 which is supported at its outer end by a suitable resilient member such as a coiled spring 22. In this way the shock is absorbed in the same manner as in the first construction. It will be understood that by the expression "rotation of the carrier" it is not meant that the carrier will ever really rotate through a revolution in this direction, as it has of course only a very limited movement, since it almost at once engages the drum and the latter slows the carrier down through the action of the compression spring. Any suitable one-way clutch may be provided for the engagement of the sleeve on the carrier and the drum, and the present one has been selected because it is extremely simple and because there is a slight lost motion connection between its driving and driven parts.

It will be seen that the transmission shown in Fig. 3 is of the three speed selective, sliding type in which the driving shaft 14 bears gears 24 and 25, the latter having jaws 26 for engagement with complementary jaws 27 on a gear 28 on the end of a sleeve 29, slidably, but non-rotatably mounted on the driven shaft 15. The intermediate speed is secured through gear 24 and a gear 30 on a stub or counter shaft 31 and then through a gear 32 on said stub shaft and gear 28. It will be seen that the gear 32 is a double gear and hence meshes with the gear 28 when the latter is engaged with the driving shaft through the clutch members, and also even when withdrawn from such clutch engagement. A new result is secured by this construction. The carrier and stud shafts and their gears are rotated in unison with the driving and driven shafts at high speed since the gear 28 is locked into gear 24 and also into gear 32. The carrier is permitted to rotate freely in this direction, the ball clutch acting only upon reverse rotation. It is thus possible to shift into intermediate speed from high without a clutch change since gear 28 continues in engagement with the gear 32. It is only necessary to slide the sleeve 29 away from gear 25 until the clutch is disengaged. The carrier then gradually slows down until it comes to stop and starts to turn in the opposite direction, until gradually stopped by the shock absorbing clutch. The advantages of this construction which permit shifting without disengaging the clutch are obvious.

There will now be no danger of "clashing" or stripping gears and the shift may be made with greater speed than in the present types of mechanism. It is, of course, unnecessary to make the gear 32 double if merely the resilient effect is desired, and in Fig. 5 it is shown of single gear width in which case no new effect will be secured in the manner or operation of the shifting. Even in the form shown in Fig. 5 the casing 13 will tend to rotate in unison with the driving shaft at high speed which will render gear shifting easy. The gear carrier is made to thus turn by the drag of the gears and the action of the grease in the casing.

The particular features to which I call attention are the resilient support for the counter shaft and its casing and the means which permit the most used gear shift (from "high" to "intermediate") to be anticipated so that no clutch action is necessary. These features are ones hitherto lacking in transmissions and are important by reason of the added convenience of handling and increased life of the mechanism.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a sliding gear transmission mechanism the combination with a fixed inclosed casing; a driving and a driven shaft journaled therein; a secondary shaft disposed parallel to said driving and driven shafts; and gear means adapted to operatively connect said three shafts; of a carrier oscillatorily mounted within said casing about said driving and driven shafts, said carrier journaling said secondary shaft; and resilient means disposed between said carrier and said casing and adapted to tend to restrain said carrier from oscillation.

2. In a sliding gear transmission mechanism, the combination with a driving and driven shaft; of a sleeve slidably mounted on said driven shaft and adapted to engage with said driving shaft; gear means normally inoperatively connecting said driving shaft and said sleeve; and means adapted to automatically render said gear means effective upon disengagement of such direct connection between said driving shaft and said sleeve.

3. In a sliding transmission mechanism, the combination with a fixed casing, a main driving shaft journaled therein and a driven shaft connected to be operated thereby; of a carrier oscillatorily mounted in said fixed casing about said main shaft and having a sleeve extending externally of said casing; and resilient means adapted to engage said sleeve and to tend to restrain said carrier from oscillation.

4. In a sliding transmission mechanism, the combination with a fixed casing, a main driving shaft journaled therein and a driven shaft connected to be operated thereby; of a carrier oscillatorily mounted in said fixed casing about said main shaft and having a sleeve extending externally of said casing; a drum rotatably mounted about such sleeve; one-way clutch means adapted to detachably connect said sleeve and said drum upon oscillation of said carrier and said sleeve in one direction; and resilient means adapted to tend to restrain said drum from oscillation.

5. In a sliding transmission mechanism, the combination with a fixed casing, a main driving shaft journaled therein and a driven shaft connected to be operated thereby; of a carrier oscillatorily mounted in said fixed casing about said main shaft and having a sleeve extending externally of said casing; a drum rotatably mounted about such sleeve; one-way clutch means adapted to detachably connect said sleeve and said drum upon oscillation of said carrier and said sleeve in one direction; a lever attached to said drum; and a resilient member adapted to support the extending end of said lever and to thereby tend to restrain said drum from oscillation.

6. In a sliding transmission mechanism, the combination with a fixed casing and a main driving shaft journaled therein; of a carrier oscillatorily mounted in said fixed casing about said main shaft and having a sleeve extending externally of said casing; a drum rotatably mounted about such sleeve; one-way clutch means having a lost motion connection and adapted to detachably connect said sleeve and said drum upon oscillation of said carrier and said sleeve in one direction; a lever attached to said drum; and a resilient member adapted to support the extending end of said lever and to thereby tend to restrain said drum from oscillation.

7. In a sliding gear transmission mechanism, the combination with a driving and a driven shaft; means adapted to directly connect the same; gear means normally inoperatively connecting said two shafts; and means adapted to automatically render said gear means effective upon disengagement of such direct connection between said shafts.

8. In a sliding gear transmission mechanism, the combination with a driving and a driven shaft; a rotatably mounted casing about said driving shaft; a stub shaft carried by said casing; a sleeve slidably mounted on said driven shaft and adapted to engage said driving shaft in one position; a gear on said driving shaft; two gears on said stub shaft, one engaging with said gear on said driving shaft, a gear on said sleeve, said other gear on said stub shaft engaging the same when said sleeve is in both engaging and disengaging relation to said driving shaft; and means adapted to restrain said casing from rotation opposite to the rotation of said driving shaft.

Signed by me, this 14th day of October, 1913.

ARNOLD RUETSCHI.

Attested by—
H. B. FAY,
A. L. GILL.